June 13, 1961 P. KENT 2,988,320
BUTTERFLY VALVE
Filed Nov. 2, 1959 2 Sheets-Sheet 1

June 13, 1961  P. KENT  2,988,320
BUTTERFLY VALVE

Filed Nov. 2, 1959  2 Sheets-Sheet 2

United States Patent Office 2,988,320
Patented June 13, 1961

2,988,320
BUTTERFLY VALVE
Preben Kent, Altadena, Calif., assignor to Clary Corporation, San Gabriel, Calif., a corporation of California
Filed Nov. 2, 1959, Ser. No. 850,208
4 Claims. (Cl. 251—174)

This invention relates to butterfly valves and has particular reference to valves of this type which are subject to wide variations in temperature.

In a large class of the above type of valves, a circular sealing ring or element of relatively soft yieldable material, such as nylon or Mylar plastic, is located in the valve casing to surround the butterfly valve member and is engaged by such member about its circumference when the valve is closed.

When such a valve is subject to extremely low temperatures, as occurs when transmitting liquid oxygen, helium, nitrogen or the like, the sealing ring tends to contract or warp out of its circular form due to shrinkage and, in some cases, due to spring means surrounding the ring.

This condition is particularly aggravated in cases where the fluid is first passed through the valve when in open condition and thereafter the valve is moved to its closed condition. Upon contact with such low temperature fluid, the sealing ring tends to stiffen in its warped form, making it difficult to return the same to its original circular shape, thereby permitting leakage and possible damage to the sealing ring when the valve is moved to its closed position.

One solution of the above problem is to use a so-called "ball" valve for controlling the flow of extremely low temperature fluids. Such valve has spherical portions on opposite sides of the opening through the ball member, which spherical portions are in continual engagement with sealing rings. Therefore, although the sealing rings tend to contract upon subjection to extremely low temperature, they will merely contract against the spherical portions to effect better sealing and will thus be prevented from warping into an out-of-round condition.

However, such ball valves present a serious drawback in that the opening therethrough must be much smaller than the outside diameter of the ball element, thereby either restricting the flow of fluid through the valve when in its open condition or requiring a valve housing which is considerably larger than the size of the fluid conduit so as to make the size of the opening through the ball member commensurate with the size of the conduit. This is often not possible when such valves are used to control fluids in relatively large diameter conduits in aircraft, guided missiles, etc., where weight and space considerations are of prime importance.

A principal object of the present invention is to obviate the above noted problems encountered by butterfly valves when used under extreme temperature conditions.

Another object is to provide a butterfly valve capable of withstanding extreme temperature conditions without appreciable leakage when in closed condition.

The foregoing objects are accomplished by providing a butterfly or disc shaped valve member with an annular section which engages the sealing ring throughout its outer periphery when the valve is in its open condition. The valve member itself engages the sealing ring throughout its periphery when the valve is closed. Thus, with the valve in either of its open or closed condition, initial contact of the low temperature fluid against the sealing ring may cause the latter to contract against the periphery of either the valve member or its annular section. During such contraction, due either to shrinking or to inward spring pressure or both, the sealing element tends to stiffen or set so that when the valve is subsequently moved to its alternate condition, the sealing element will substantially retain its original circular shape. Thus, the sealing element will adequately seal the valve when moved to its closed condition.

The manner in which the above and other objects of the invention are accomplished will be readily understood on reference to the following specification when read in conjunction with the accompanying drawings, wherein.

The valve comprises a casing 5 (FIGS. 2 and 3), which is connected in a manner not shown to a source of fluid supply, the flow of which is controlled by the valve. The casing 5 has a bore 6 therethrough which enlarges slightly into a second bore 7.

Figure 4:
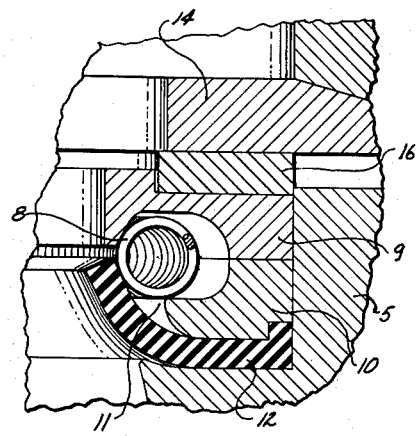
FIG. 4 is an enlarged fragmentary sectional view illustrating the sealing means for the valve element.

A helically wound tension spring 8 is entrapped between two ring members 9 and 10 (FIGS. 2 and 4) having a gap 11 through which the spring 8 will apply a radial pressure against an annular sealing ring 12 of Mylar or similar flexible plastic material, said sealing ring being entrapped between a shoulder 13, of the casing and the ring member 10.

The entrapment of the spring 8 is such that should the spring break it will be retained in the opening between the members 9 and 10, thereby preventing it from dropping into the fluid stream.

A retainer ring 14 snaps into a groove 15 and, through a Belleville spring 16, holds the ring members 9 and 10, and also the sealing ring 12 in their respective positions.

Figure 1:
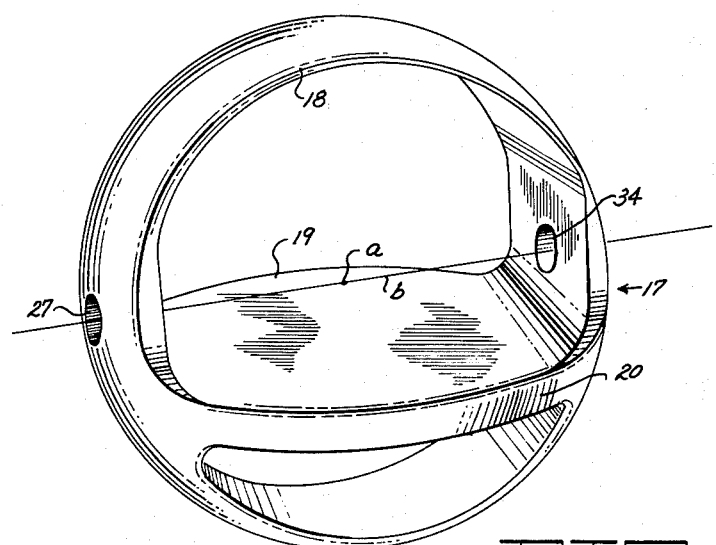
FIG. 1 is a perspective view of a butterfly valve element embodying a preferred form of the present invention.

A butterfly valve element 17 (FIGS. 1, 2 and 3), is formed of a disc 19, said disc being integral with a ring shaped section having a spherical surface 18. The outer periphery 20 of the disc 19 is formed with a spherical surface whose center $a$ coincides with the center of the spherical surface of the ring 18.

The valve element has a bearing hole 34 rotatably fitted over a pivot pin 21, said pivot pin having a head 22 which is secured to said casing 5 by a bolt 23. Between the casing and the head 22 is positioned a gasket 24 to prevent leakage.

A drive pin 25 is provided which extends coaxially of pin 21 and has a serrated end 26 which fits in a mating serrated hole 27 in the element at a point opposite to the pin 21. The pin 25, at its opposite end, carries an actuator member 28 which is securely mounted on the pin through a set screw 29.

The pin 25 is rotatably journalled by a bearing formed in the casing 5 and is surrounded by a sealing ring 33 held in place by a threaded bushing 32 and interposed ring 31.

It will be noted that the coincident center of curvature $a$ of the peripheral surfaces of the disc 19 and ring section 18 lies on the pivot axis $b$ of the valve element 17. Also, the axis $b$ is located to one side of the disc 19.

Figure 2:
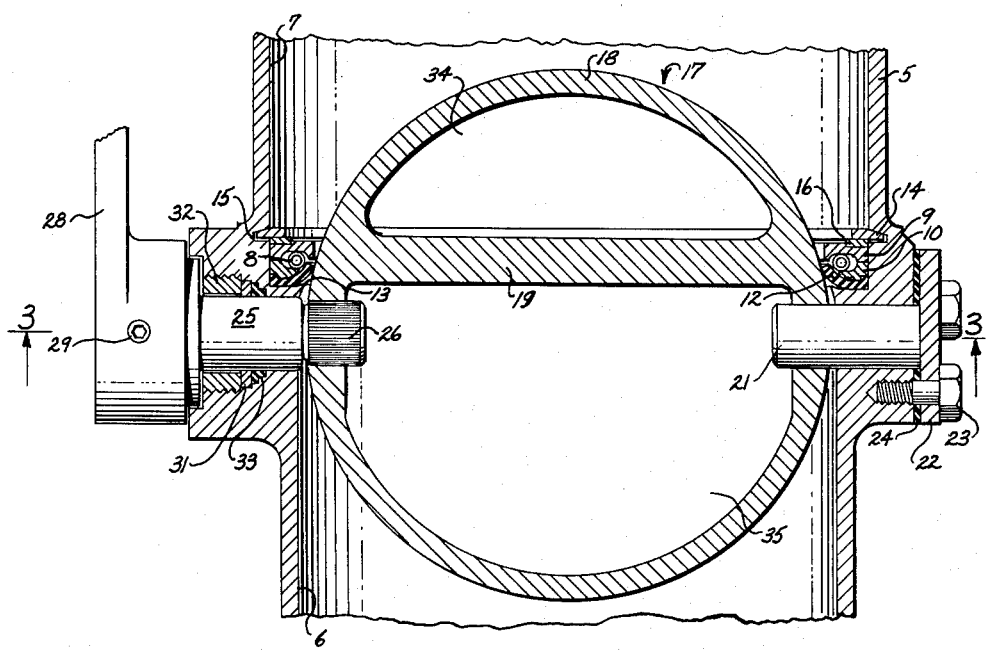
FIG. 2 is a sectional view through a complete valve and is taken along the line 2—2 of FIG. 3, showing the valve element in its closed position.
Figure 3:
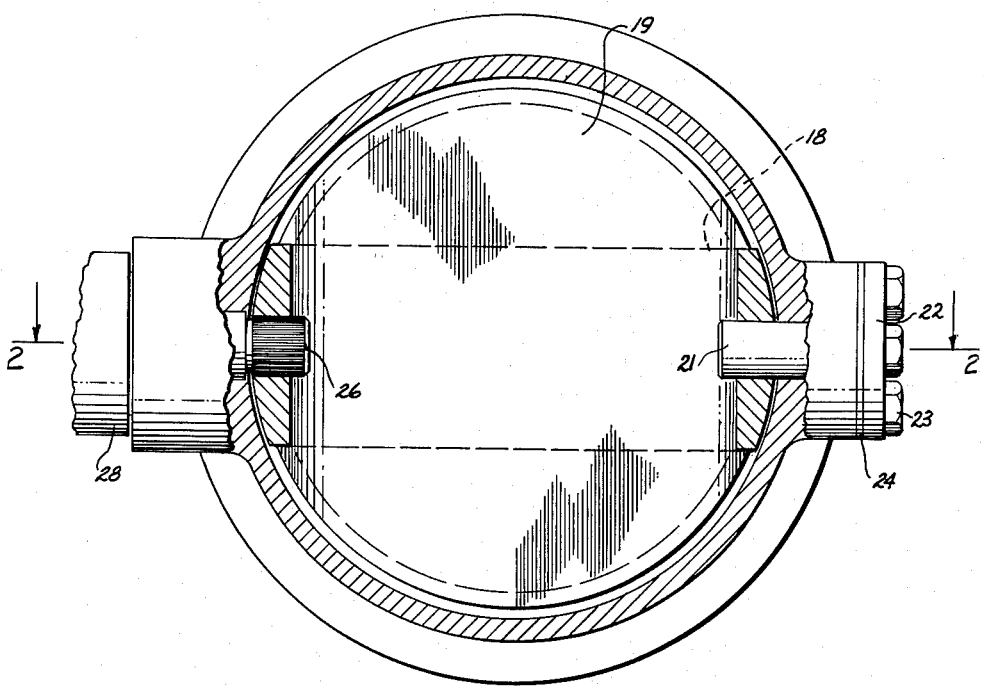
FIG. 3 is a sectional view taken along the line 3—3 of FIG. 2.

The valve element 17 is shown in FIGS. 2 and 3 in its closed position wherein the entire outer periphery of the disc 19 is in contact with the sealing ring 12. Upon substantially a 90° rotation of the actuator member 28, in either direction the element 17 will also rotate an equivalent amount, thereby positioning the ring 18 in contact with the sealing ring 12 and to hold said sealing ring in its respective diameter while allowing the fluid to pass through openings 34 and 35 in the element 17.

It should be noted that the ring 18 could be half its width and the valve would still work when the actuator is moved in the appropriate direction, but by making the ring double width the necessity for making different parts for right- and left-hand valves is eliminated.

Although I have described my invention in detail, and have therefore used certain specific terms and languages herein, it is to be understood that the present disclosure is illustrative rather than restrictive and that changes and modifications may be made without departing from the spirit or scope of the invention as set forth in the appended claims.

Having thus described the invention, what I desire to secure by United States Letters Patent is:

1. A butterfly valve comprising an annular casing, an annular yieldable sealing ring carried in said casing, said sealing ring being subject to contraction, a valve disc in said casing, means supporting said disc for movement from a closed position wherein the entire periphery of said disc engages the inner periphery of said sealing ring to a fully open position wherein the interior of said casing is open to full fluid flow, and an annular section on said disc, the entire outer periphery of said annular section engaging said entire inner periphery of said sealing ring when said valve disc is in said fully open position.

2. A butterfly valve comprising an annular casing, an annular yieldable sealing ring carried in said casing, said sealing ring being subject to contraction, a valve disc in said casing, the periphery of said disc being of spherical shape, means supporting said disc for movement from a closed position wherein at least a portion of the entire peripheral area of said disc engages at least a portion of the inner peripheral area of said sealing ring completely around said disc to at least a substantially fully open position wherein the interior of said casing is open to full fluid flow, and an annular section on said disc, the entire outer periphery of said annular section being of spherical shape, at least a portion of the outer peripheral area of said annular section engaging at least a portion of the inner peripheral area of said sealing ring completely around said annular section when said valve disc is in said open position, the center of curvature of the periphery of said disc being coincident with the center of curvature of said section.

3. A butterfly valve comprising an annular casing, an annular yieldable sealing ring carried in said casing, said sealing ring being subject to contraction, a valve disc in said casing, the periphery of said disc being of spherical shape, means supporting said disc for pivotal movement about an axis extending across said casing from a closed position wherein at least a portion of the entire peripheral area of said disc engages at least a portion of the inner peripheral area of said sealing ring completely around said disc to at least a substantially fully open position wherein the interior of said casing is open to full fluid flow, and an annular section on said disc, the outer periphery of said annular section being of spherical shape, at least a portion of the outer peripheral area of said annular section engaging at least a portion of the inner peripheral area of said sealing ring completely around said annular section when said valve disc is in said open position, the center of curvature of the periphery of said disc and the outer periphery of said annular section being coincident with each other and with said pivotal axis.

4. A butterfly valve comprising an annular casing, an annular yieldable sealing ring in said casing, annular entrapment members in said casing having grooves in their abutting faces, one of said members having an opening around its inner periphery, an annular shaped tensioned helical spring having an outside diameter larger than said opening between said entrapment members, said spring being entrapped in said grooves and protruding partially through said opening whereby to contract said sealing ring, a valve disc in said casing, the periphery of said disc being of spherical shape, means supporting said disc for pivotal movement about an axis extending across said casing for guiding said disc from a closed position wherein at least a portion of the entire peripheral area of said disc engages at least a portion of the inner peripheral area of said sealing ring completely around said disc against the action of said tensioned spring, to at least a substantially fully open position wherein the interior of said casing is open to full fluid flow, and an annular section on said disc, the outer periphery of said annular section being of spherical shape, at least a portion of the outer peripheral area of said annular section engaging at least a portion of the inner peripheral area of said sealing ring completely around said annular section against the action of said tensioned spring when said valve disc is in said open position, the center of curvature of the periphery of said disc and the outer periphery of said section being coincident with each other and with said pivotal axis.

References Cited in the file of this patent

UNITED STATES PATENTS

| | | |
|---|---|---|
| 2,162,104 | Mosher | June 13, 1939 |
| 2,253,904 | Haug | Aug. 26, 1941 |
| 2,741,138 | Russell | Apr. 10, 1956 |
| 2,819,868 | Cauffman | Jan. 14, 1958 |
| 2,893,682 | Hintzman | July 7, 1959 |